(12) United States Patent
Sawdy et al.

(10) Patent No.: US 6,389,559 B1
(45) Date of Patent: May 14, 2002

(54) CONTROLLER FAIL-OVER WITHOUT DEVICE BRING-UP

(75) Inventors: Don Sawdy; Arthur L. Rogers, both of San Jose, CA (US)

(73) Assignee: MTI Technology Corporation, Anaheim, CA (US)

(*) Notice: Subject to any disclaimer, the term of this patent is extended or adjusted under 35 U.S.C. 154(b) by 0 days.

(21) Appl. No.: 09/578,530

(22) Filed: May 24, 2000

(51) Int. Cl.[7] .................................................. G06F 11/00
(52) U.S. Cl. .......................................... 714/42; 711/114
(58) Field of Search ................................. 714/42, 43, 3, 714/4, 6, 5, 8, 25, 11, 12, 31, 770, 771, 47, 13, 7; 710/20, 15; 711/114, 115, 162

(56) References Cited

U.S. PATENT DOCUMENTS

| | | | | |
|---|---|---|---|---|
| 5,140,592 A | * | 8/1992 | Idleman et al. | ................. 714/5 |
| 5,212,785 A | * | 5/1993 | Powers et al. | |
| 5,221,785 A | * | 6/1993 | Ando et al. | ................. 525/123 |
| 5,274,645 A | * | 12/1993 | Idleman et al. | ................. 714/6 |
| 5,651,110 A | * | 7/1997 | Powers et al. | ................. 714/7 |
| 5,975,738 A | * | 11/1999 | DeKoning et al. | ........... 364/184 |
| 5,987,621 A | * | 11/1999 | Duso et al. | ..................... 714/4 |
| 6,070,251 A | * | 5/2000 | Chong | ......................... 714/12 |
| 6,105,146 A | * | 8/2000 | Tavallaei et al. | ............... 714/2 |
| 6,219,753 B1 | * | 4/2001 | Richardson | ................. 711/114 |

* cited by examiner

*Primary Examiner*—Nadeem Iqbal
(74) *Attorney, Agent, or Firm*—Townsend and Townsend and Crew, LLP

(57) ABSTRACT

A method and apparatus for reducing the bring-up time upon a transfer of control. This is accomplished by performing the physical level access bring-up prior to fail-over or other transfer, on the devices which are only secondarily controlled by the controller. The media level access is performed only by the controller with primary control of the devices. Upon a failure or transfer by the first controller, a media level access can be immediately performed by the second controller without doing a physical level access first, since this had been done prior to the fail-over or transfer.

7 Claims, 4 Drawing Sheets

CONTROLLER FAIL-OVER WITHOUT DEVICE BRING-UP

BACKGROUND OF THE INVENTION

The present invention relates to fault tolerant mass storage, and in particular to mechanisms for transferring control between two controllers.

In fault tolerant mass storage systems, often two different controllers are each connected to the same group of disk drives for redundancy. Each controller has primary control over a different set of the disk drives in the group. In the event that there is a failure of one of the controllers, the other controller can take over the controller function for the set of disk drives that were previously controlled by the other controller. An example of such a system for redundant arrays of independent disks (RAID) is set forth in U.S. Pat. No. 5,140,592.

One of the challenges of a controller fail-over or other transfer is to reduce the elapsed time between the transfer and when the data on the disk drive is available to the partner controller. The partner controller must detect the fail-over, and then must detect and bring up the devices that were owned by the failing, or relinquishing controller.

Bring-up is the process of preparing a device (disk drive) for controller communication. This process consists of multiple SCSI commands such as Test Unit Ready, Inquiry, Read Capacity, Start, and Mode Sense. These commands must all be successfully completed to allow media access of the disk drives. This bring-up process can result in a significant delay (30 seconds to several minutes) before the media is available to the new controller on a fail-over recovery.

It would be desirable to reduce the amount of time for accessing the disk drives after a failure or other transfer of control.

SUMMARY OF THE INVENTION

The present invention provides a method and apparatus for reducing the bring-up time upon a transfer of control. This is accomplished by establishing two levels of device availability, physical and media level. Physical level access is performed during bring-up by all connected controllers, prior to fail-over or other transfer, on the devices. The media level access is performed only by the controller with primary control of the devices. Upon a failure or transfer by the first controller, a media level access can be immediately performed by the second controller without doing a physical level access first, since this had been done prior to the fail-over or transfer.

All controllers have at a minimum a physical level access to any one device at all times after the initial access. The physical level access allows commands used for bring-up, non-destructive diagnostic or device monitoring functions. It is at the physical level that device communication capability is validated. The exclusive access or media level access allows the use of all I/O commands. This level is only made available to the media subsystem of one controller at a time. The media level ownership of devices is governed by a continuing agreement process between the two controllers.

For a further understanding of the nature and advantages of the invention, reference should be made to the following description taken in conjunction with the accompanying drawings.

DESCRIPTION OF THE SPECIFIC EMBODIMENTS

Figure 1:
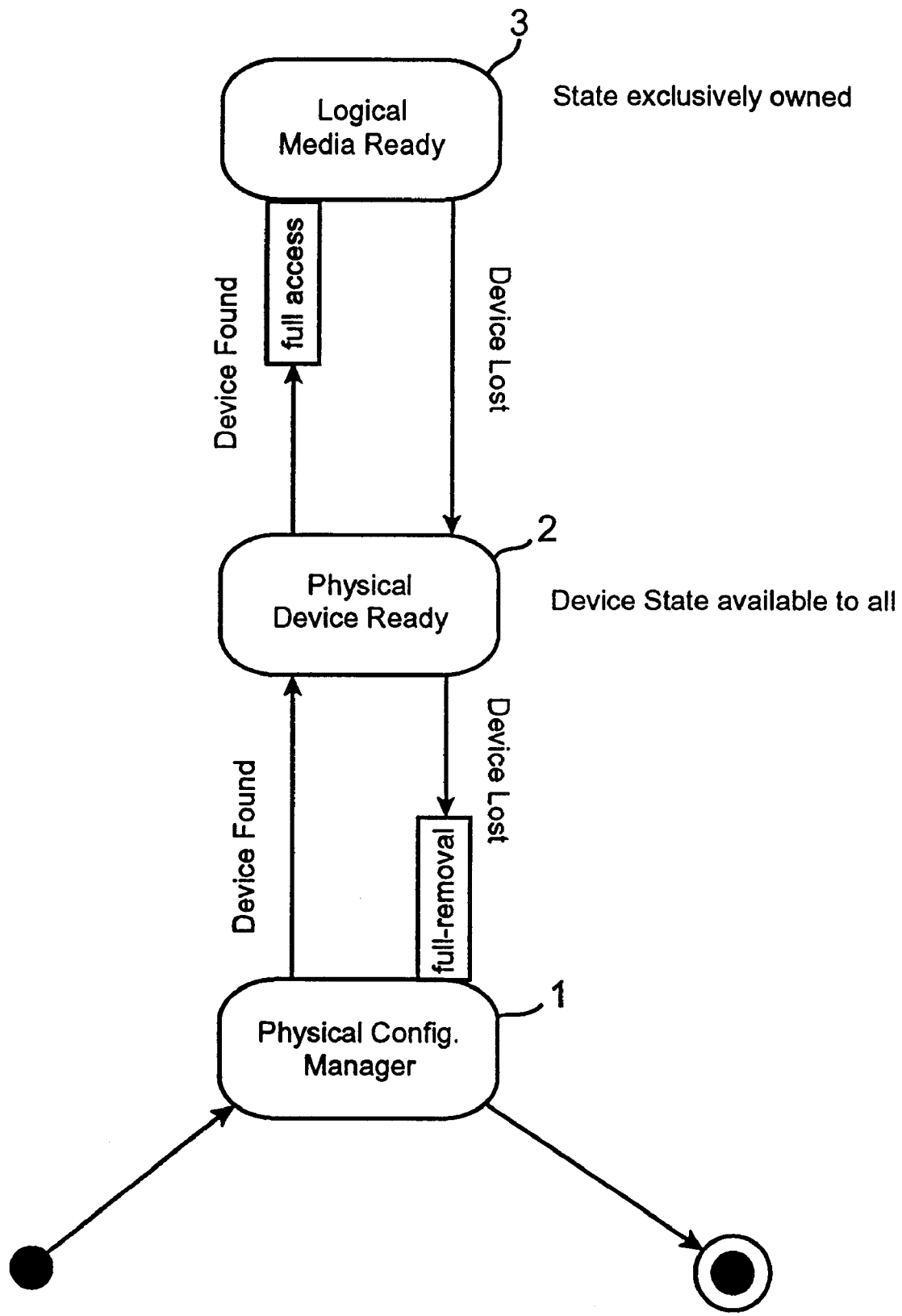
FIG. 1 is a state diagram illustrating the physical and media states according to an embodiment of the invention.

FIG. 1 is a state diagram illustrating one embodiment of the invention. A physical configuration manager 1 is used by each controller to transition to a physical device ready state 2 for all the devices, or disk drives, to which it is attached. Preferably, for this to be accomplished, the cabling is first verified to ensure that the connections to the physical devices are the same for both controllers. An example of such a verification of a cabling system is set forth in copending application Ser. No. 09/578,830, filed even date herewith, entitled "Storage Network Cabling Verification System," and incorporated herein by reference. In order to find a device and to transition into state 2, a device bring-up physical level access initialization is performed. This involves using multiple SCSI commands such as Test Unit Ready, Inquiry, Read Capacity, Start and Mode Sense. Once these tests are completed, physical level access is allowed for each controller for such functions as non-destructive diagnostic and device monitoring.

The primary controller will then transition to a logical media ready state 3. This establishes exclusive access for that controller for media level access, which allows use of all I/O commands.

Upon a failure of one controller, or a transition to the other controller, the failing or transferring controller will transition out of state 3 back to state 2. The acquiring controller will transition from state 2 to state 3. Since the acquiring controller is already in state 2, there is no need to perform the steps necessary to attain state 2, thus eliminating the time associated with these steps.

Figure 2:
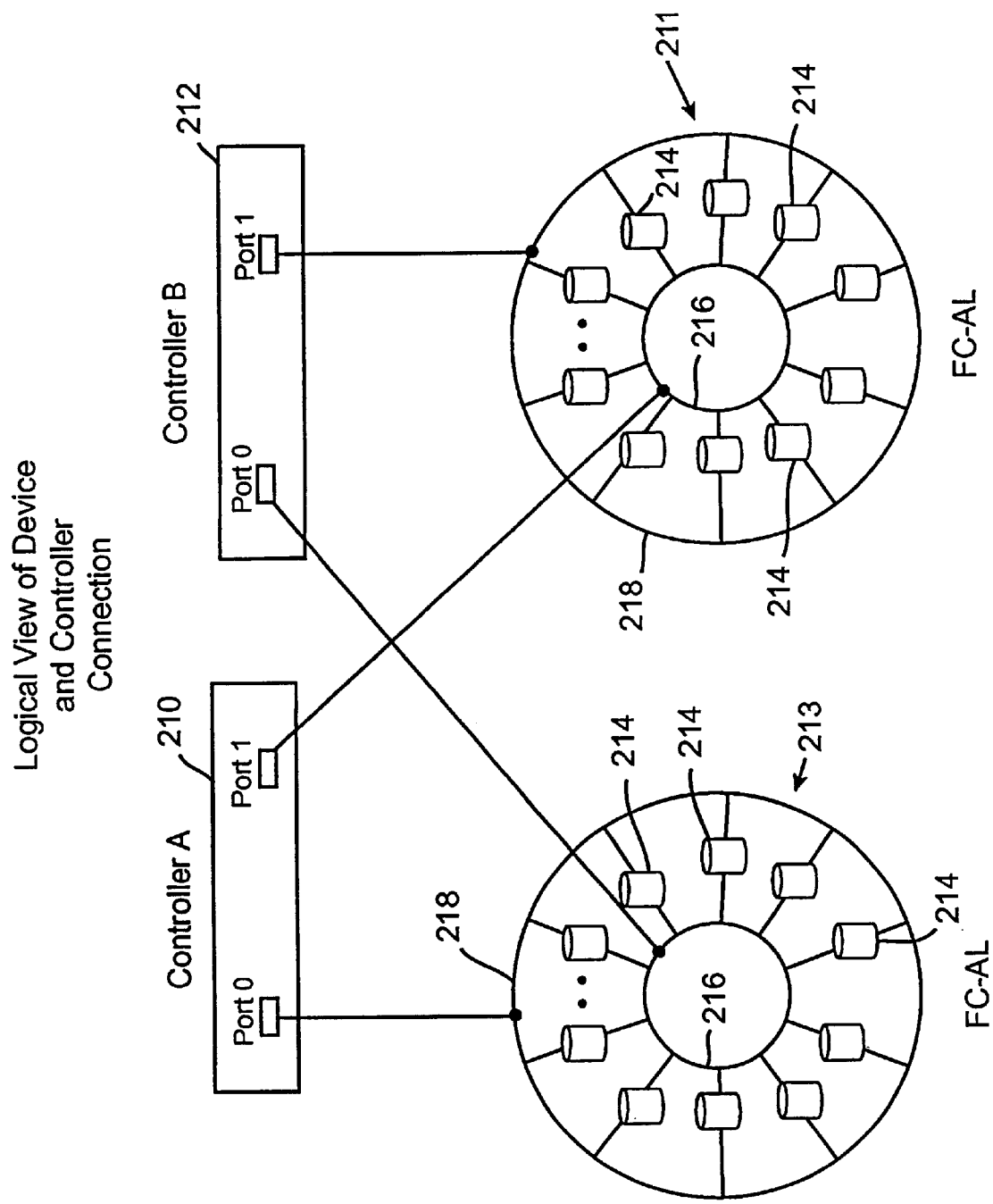
FIG. 2 is a block diagram illustrating an embodiment of the controller connections.

FIG. 2 is a diagram illustrating the connection of two controllers (210, 212) to common disk drives (214). The portion of each controller shown is the fibre channel port interface to the fibre channel cables attaching the disk drives. Each circular diagram (211, 213) represents a loop, which attaches the disk drives. The drives have dual fibre channel ports, represented by the inner (216) and outer (218) circles.

Figure 3:
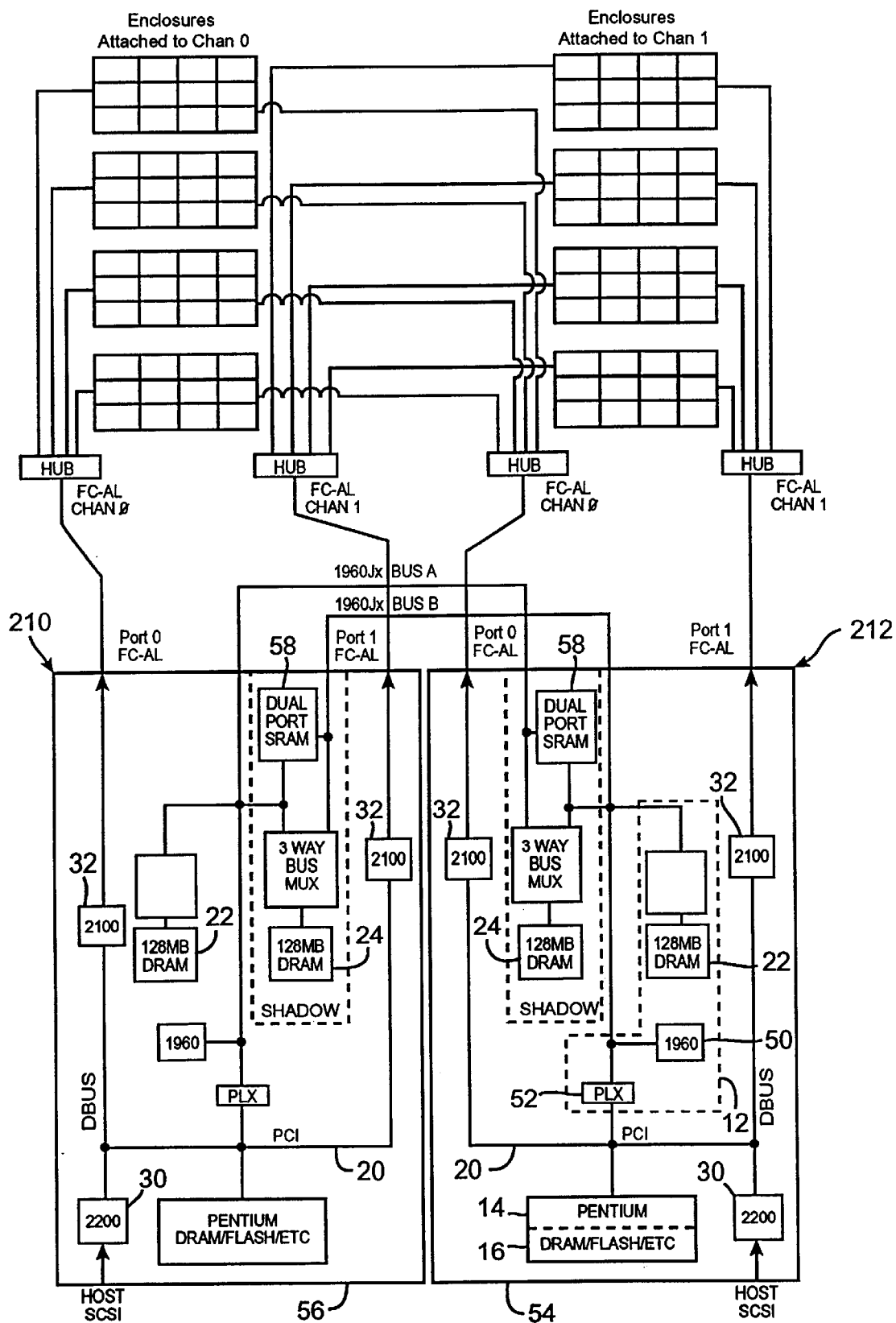
FIG. 3 is a block diagram illustrating in more detail the elements of the controllers of FIG. 2.

FIG. 3 is a block diagram of one embodiment of the controllers 210 and 212 of FIG. 2.

As can be seen, data flow is provided through two different host Fibre Channel (FC) interfaces 30 to the disk drives 214. Each host interface 30 communicates with two RAID interfaces 32 over PCI busses 20. Data is staged in-between them in a buffer memory 22. Shadow buffer memories 24 are provided for redundancy.

A RAID engine controller 50 is used for generating RAID functions. Microprocessor 14 performs program operations, and then the particular operation codes are transmitted across PCI bus 20 through PLX interface 52 to controller 50.

Figure 4:
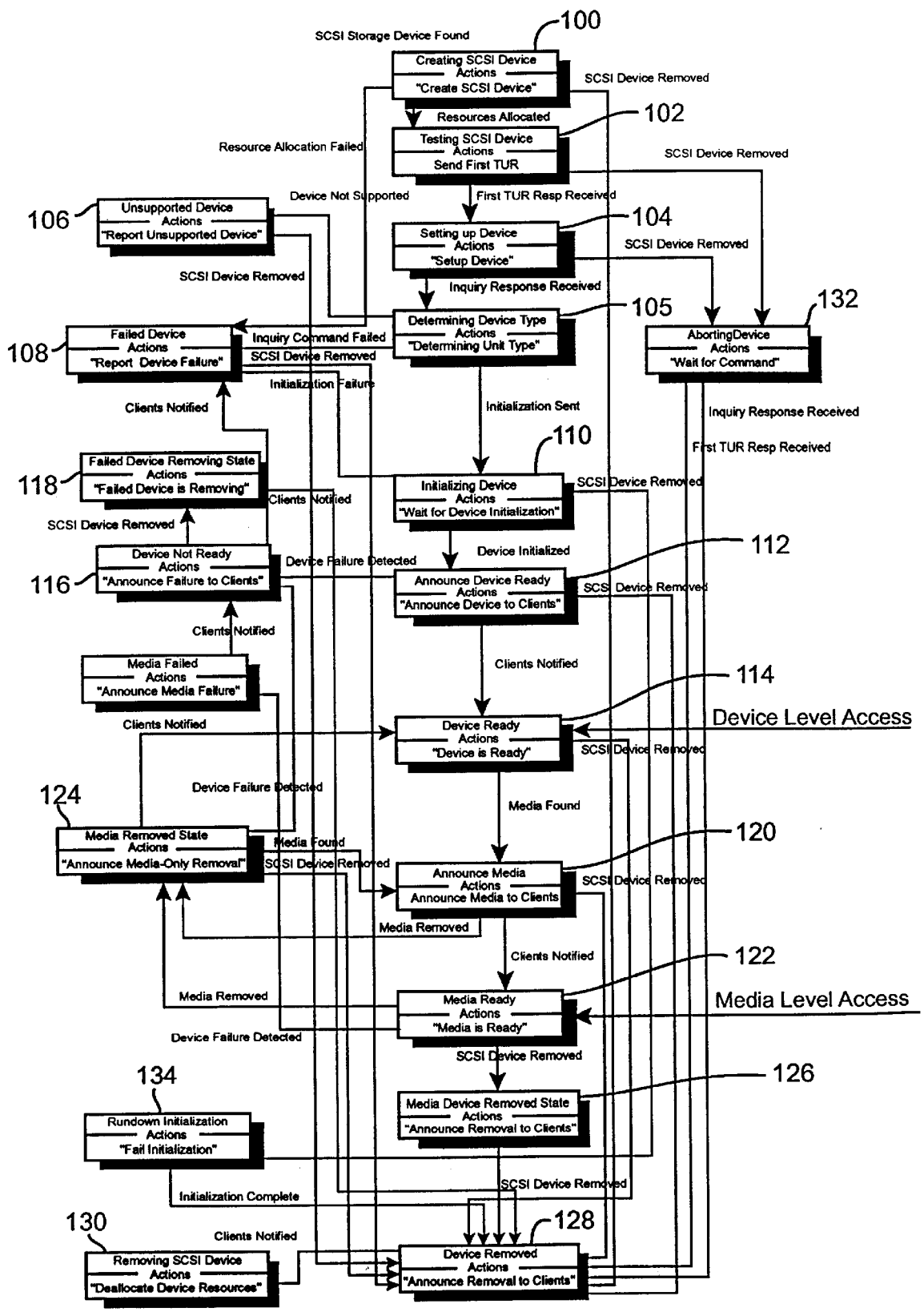
FIG. 4 is a flowchart illustrating one embodiment of the invention.

FIG. 4 is a state machine diagram illustrating the present invention. In state 100, an SCSI storage device is found and an object representing the SCSI device is created in memory. In a state 102, the SCSI device is tested by sending the first TUR (Test Unit Ready).

Upon receiving the response to the first TUR, in a state 104, the device is set up. Upon receiving an inquiry response, in a state 105, the unit type is determined. If the device is unsupported, a state 106 is entered. If the device fails, a state 108 is entered.

The device is initialized in a state 110. After device initialization, the device is announced to be ready to its clients in state 112. The clients (the host systems using the RAID system) are then notified and a device ready state 114 is entered.

If the device was not ready in state 112, a state 116 is entered for device not ready, and the SCSI device is removed, entering a state 118.

Once state 114, device ready, has been entered, the physical level access or device level access has been accomplished, and this completes the process for the secondary controller.

The primary controller will then move forward to establish a media level access by entering a state 120. Upon completion of the media level access, a media ready state 122 is entered into after the clients have been notified.

Upon removal of media access, such as due to a controller relinquishment or failure, the primary controller exits state 122 and enters media removed state 124. The secondary controller then transitions from state 114, which it is already in, to states 120 and 122 to take over media level control of the devices.

In the event a SCSI device is completely removed, the primary controller will transition from state 122 to a state 126, announcing removal to the clients, and then will go to a device removed state 128 and finally to a removed SCSI device state 130 which deallocates device resources.

Other states include an aborting device state 132 which is entered into if the SCSI device is removed during state 102 or state 104. A run down initialization state 134 is entered if the SCSI device is removed during state 110.

Preferably, the present invention does the physical access using an SES (SCSI enclosure service) device in the RAID array. By doing the physical level access ahead of time, anywhere from 30 seconds to a few minutes may be saved on the transition from a failing controller.

As will be understood by those of skill in the art, the present invention may be embodied in other specific forms without departing from the essential characteristics thereof. For example, N controllers could be used instead of 2, and any number of M storage devices could be used. Accordingly, the foregoing description is intended to be illustrative, but not limiting, of the scope of the invention which is set forth in the following claims.

What is claimed is:

1. In a mass storage system having first and second mass storage controllers, both connected to a plurality of disk drives, the method comprising:

performing a physical level access initialization of each of said plurality of disk drives by said first controller;

performing a physical level access initialization of each of said plurality of disk drives by said second controller;

performing a media level access initialization of each of said plurality of disk drives by said first controller; and upon a failure of said first controller, performing a media level access initialization of each of said plurality of disk drives by said second controller, without doing a physical level access initialization after said failure of said first controller.

2. The method of claim 1 wherein said performing a physical level access comprises; creating a first object in a memory of said first controller corresponding to each of said disk drives; and creating a second object in a memory of said second controller corresponding to each of said disk drives.

3. The method of claim 1 wherein said physical level access initialization comprises accessing an SES device.

4. The method of claim 1 wherein said controllers are RAID controllers.

5. The method of claim 1 wherein there are N controllers and M drives.

6. A method of transferring control among controllers in a storage system, the method comprising the steps of:

coupling a primary controller to a plurality of disk drives;

coupling a secondary controller to the plurality of disk drives;

bringing-up the primary and secondary controllers to a physical level access state;

bringing-up the primary controller to a media level access state; and upon a transfer of control from the primary controller to the secondary controller, bringing-up the secondary controller to the media access level state, without having to first bring-up to the physical level access state.

7. The method of claim 6 wherein the controllers are RAID controllers.

* * * * *